United States Patent [19]

Coker

[11] Patent Number: 4,494,012
[45] Date of Patent: Jan. 15, 1985

[54] SWITCH TIMER

[75] Inventor: Charles W. Coker, Los Gatos, Calif.

[73] Assignee: Intermatic Incorporated, Spring Grove, Ill.

[21] Appl. No.: 549,721

[22] Filed: Nov. 7, 1983

Related U.S. Application Data

[63] Continuation-in-part of Ser. No. 314,963, Oct. 26, 1981, abandoned.

[51] Int. Cl.³ .............................................. H01H 43/04
[52] U.S. Cl. .................................. 307/132 E; 315/360; 307/141; 307/143
[58] Field of Search .................. 307/141, 141.4, 141.8, 307/143, 157, 592, 597, 603; 315/360

[56] References Cited

U.S. PATENT DOCUMENTS

| | | | |
|---|---|---|---|
| 4,002,925 | 1/1977 | Monahan | 315/360 |
| 4,096,542 | 6/1978 | Pappas et al. | 307/141 |
| 4,336,464 | 6/1982 | Weber | 315/360 |
| 4,349,748 | 9/1982 | Goldstein et al. | 307/132 E |

*Primary Examiner*—E. A. Goldberg
*Assistant Examiner*—Todd E. DeBoer
*Attorney, Agent, or Firm*—Wallenstein, Wagner, Hattis, Strampel & Aubel, Ltd.

[57] ABSTRACT

A switching timer device includes a manual switch having "on", "off" and "timer" positions. When the switch is set in the "on" position a load is supplied continuous power from a source. When the switch is set in the "timer" position, a load-powering power switch is closed for a predetermined length of time determined by a timer that is automatically reset when the manual switch is so actuated, and after elapse of the predetermined time the power switch is opened to de-energize the load. The timer is configured as a direct replacement for existing wall-mounted switch units without requiring access to the low side of the line, and consumes no internal power when in the normal "on" position.

8 Claims, 4 Drawing Figures

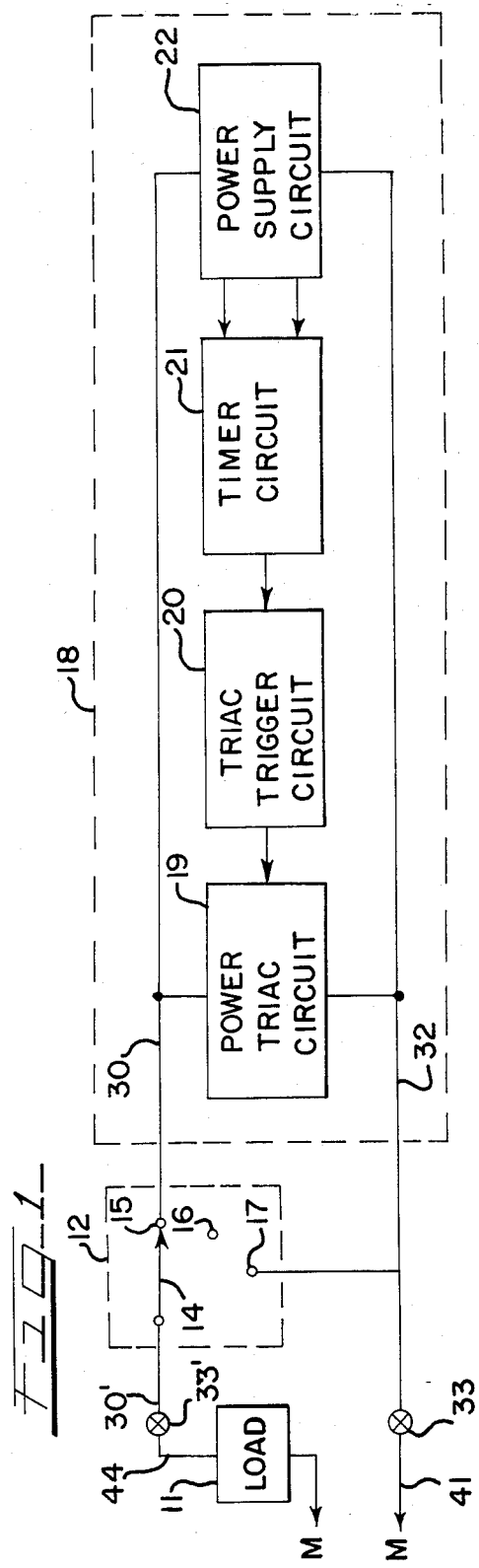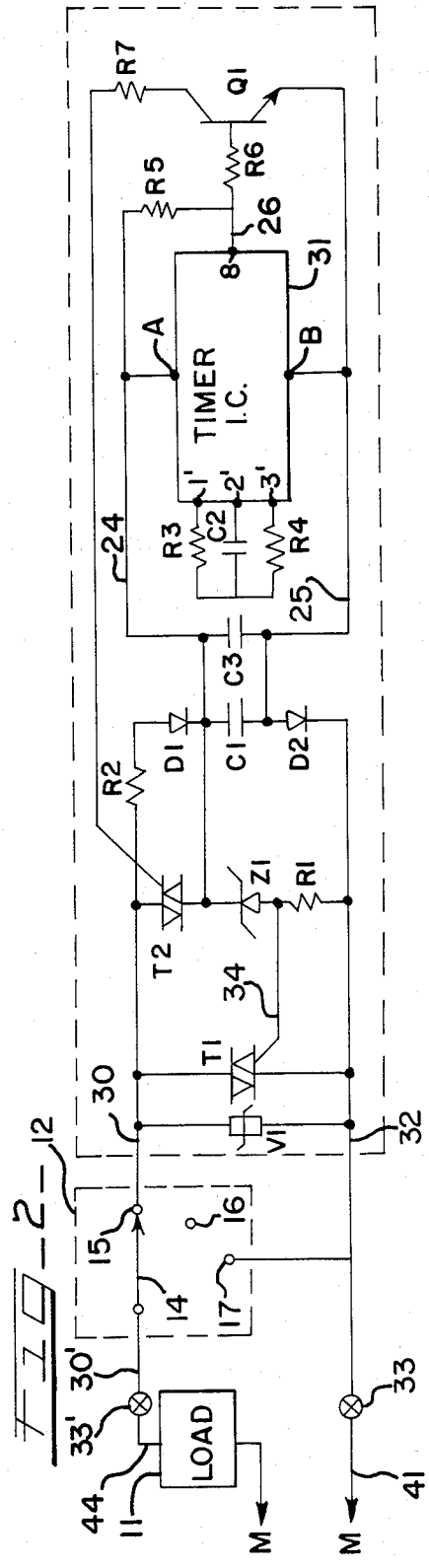

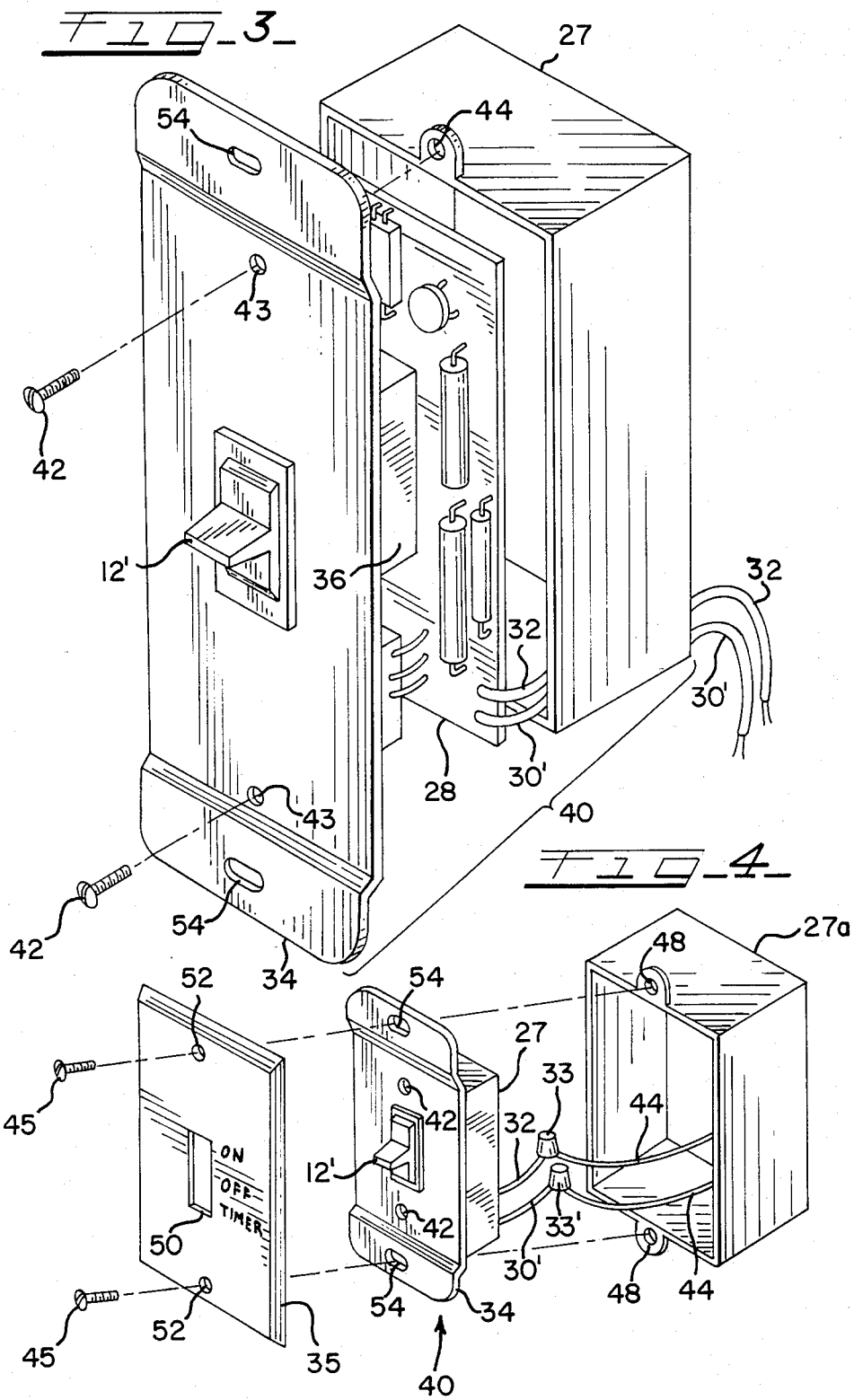

SWITCH TIMER

RELATED APPLICATION

This application is a continuation-in-part of U.S. patent application Ser. No. 314,963, filed Oct. 26, 1981 now abandoned.

TECHNICAL FIELD OF THE INVENTION

The technical field of the invention is wall-mounted timers which turn off associated loads after a prescribed interval of time.

BACKGROUND OF INVENTION

The subject matter of the invention is a delay switch whereby electrical loads, such as electric lights controlled by a wall-mounted light switch, may be turned on either to remain on indefinitely, or alternatively to turn off after the elapse of a predetermined period of time as measured from the instant of switch actuation. Such devices in one form or another are long known in the art, and have proven themselves to be quite useful in automatically turning off such electrical loads as, for example, garage lights. In such situations the garage lights are turned on for a period of time while the operator is leaving the house to enter his car and drive off, the light automatically shutting down after a predetermined period of time. Alternatively, such timers find similar applications in lighting circuits, wherein the user actuates the timer to an automatic delayed power-off condition when he knows that he will be leaving the room with his arms encumbered, as a consequence of which he will be unable to turn the light switch off by hand.

A variety of timers are known in the art. Thus, for example, U.S. Pat. No. 4,002,925 issued to Monahan discloses a wall receptacle-mounted timer having a single toggle switch extending through a front mounting plate, the switch being actuatable to a variety of positions and providing not only delayed power-off, but also a delayed power-on feature as well. Because of the provision for a delayed power-on feature, the number of necessary switch positions is accordingly increased. The Monahan system suffers from the disadvantage that it cannot be inserted directly into the existing hot line wiring, but requires access to the low side of the line as well so as to provide power for an associated power supply used to power the timing circuitry, the supply being connected at all times across the power lines. Thus, to apply the Monahan system to existing wiring, an additional wire must be brought up to the conduit to the wall receptacle box. Moreover, since the power supply in always on, there is a constant expenditure of power by the system, and as stated above, it is considered a desirable feature to eliminate all such parasitic power losses when the timing system is not operating in timing mode.

A related approach is disclosed in U.S. Pat. No. 4,336,464 issued to Weber, which discloses a timer insertable directly into the hot line without requiring access to the low (common) line, and which further shows a load-energized power supply deriving its current from the hot line without requiring connection to the low line. It therefore has the direct insertion feature previously described as desirable; however, no provision is made for turning off this power supply and the concomitant power consumption when the associated electrical load is driven in a conventional power-on condition, this power loss being present in both the power-on and timer-on modes of the system. Thus, an additional energy wastage is encountered. Additionally, the Weber system requires a pair of independent switches and does not show the desirable feature of a single actuating switch.

Thus, the prior art does not show in any one embodiment a simple time delay three-position wall mountable switch configured for direct replacement of conventional wall-mounted toggle switches and having associated timing circuitry which can be powered solely by access to the hot line to the load, and which draws no parasitic power whatever except when specifically actuated to the timing mode. Such a device would constitute a new, useful, and non-obvious contribution to the art.

SUMMARY OF INVENTION

According to the invention, a simple power-off timing circuit is configured to be mounted as an assembly in a conventional wall switch plate receptacle, and is selectively actuatable by a single three-position switch to a power-on, a power-off, and a timer-on condition, wherein the unit remains in a power-on condition for a preset period of time after actuation thereto, thereafter reverting to a power-off state. In contrast to the Monahan system, the timing circuit and its associated power supply are completely disconnected from the power lines except during the limited period of operation of the timer in its active phase. Moreover, the timer can be connected directly to the "hot" wire of the power line to which a conventional switch is normally connected, without requiring feeding the common side of the line to the timer. Only a single switch is employed, and no power supply current is required while the switch is in the regular power-on condition, in contrast to the Weber system. The number of necessary parts is held to an absolute minimum, and a substantial measure of circuit simplicity in cost economy is achieved by using the self-resetting feature of a commonly available integrated circuit timing chip.

Additionally, the assembly is designed to match with the customary toggle accepting slotted front cover plate used in conjunction with conventional wall switch box assemblies, so that no modification of an existing wall plate is necessary, the entire assembly using existing standard, the actuating switch handle of the timer being configured to fit through the vertically oriented slot of view cover plate to be actuated in a vertical direction, but having three stable positions, as contrasted with the normal two position assemblies.

The above described invention is to be contrasted with the teachings of U.S. Pat. No. 4,349,749 issued to Goldstein, et. al. This patent discloses a complex programmable timer wherein the user sets various intervals of a 24 hour period to be automatically switched on or off. To this end, an internal timer circuit must always be in operation, since it carries a representation of the present time of day. This kind of timer, unless manually repeatedly overridden continues to cycle loads, such as light on and off automatically during various preset intervals. This patent does not in any case show the simple feature whereby at any time an operator, simply by flipping a switch, may initiate an elapsed time actuation of a remote device without going through a series of elaborate reprogramming steps. Moreover, this timer fails to accomplish another feature of the present invention, namely power economy.

U.S. Pat. No. 4,096,542 issued to Pappas et. al. discloses a timer which performs some of the features of the present invention, but performs them in an inverse order to that desired, in that this system turns a timer on automatically at a preset time and thereafter turns off an associated device solely by means of sensing a decrease in the associated system load. As contrasted to the present invention, the objectives are completely opposite; the timer of the present invention is turned on manually to remain in such condition for a fixed period of time thereafter, and is moreover configured to remain in such configuration quite irrespective of any variation of the system load. Thus the timer of the present invention will function perfectly well under widely varying current conditions to the system load, e.g. high motor start-up currents followed by lower sustaining currents. Moreover, the Pappas system apparently needs a constant supply of direct voltage for a power supply to allow the sensing amplifiers to respond to a timer-on signal. Thus, additional power dissipation from the power mains is incurred during power-off conditions, whereas a feature of the present invention is that such power consumption is present solely while the timing system is in its active phase, to be totally disconnected thereafter.

Other features and advantages of the present invention will be apparent from the following more particular description of the invention. The accompanying drawings, listed hereinbelow, are useful in explaining the invention.

DESCRIPTION OF DRAWINGS

FIG. 1 shows in schematic block diagram form a power control circuit of the present invention used to control electrical power supplied from a source to a load, the actuation of the control circuit being governed by an interposed three position switch;

FIG. 2 is an expanded schematic view of the elements of FIG. 1, showing in particular the internal circuitry of the power control circuit of FIG. 1;

FIG. 3 is an exploded view of a preferred embodiment of the power control circuit and three-position switch of FIG. 1 configured to be assembed into a box having a control switch extending outwardly therefrom; and FIG. 4 is an exploded view showing the insertion of the box of FIG. 3 into a standard wall mounted switch box, and having an associated covering face plate mounted thereon.

DESCRIPTION OF INVENTION

As shown in block diagram form in FIG. 1, a switch timer is used to control power to a pair of a.c. lines M—M powering load 11. More specifically, line 44 represents a line (typically already installed in wiring conduit) leading from a wall-mounted switch box (See FIG. 4) to the load 11 to be controllably actuated. Line 44 connects to one input control line 30' of the switch timer via a connector 33. Similarly, the remaining line 41 goes directly to system mains, and is connected to the other input control line 32 via a connector 33'.

It is desired that the load 11, as for example a light, be optionally automatically turned off after a predetermined time period after switching it on. For this purpose there is provided a three-position switch 12, which can be actuated by movement of the pole 14 to a "timer" position contacting contact 15, an "off" position contacting contact 16, and an "on" position contacting contact 17. When the switch 12 is actuated to the "on" position, there is a direct circuit connecting the load to the power lines M—M, and in this case the switch acts exactly like a single pole-single throw switch currently found in standard wall fixture. When the pole is moved to the "off" position, there is no complete circuit to the load, and no energy is supplied therethrough. When the pole 14 is moved to the "timer" position, the load circuit is completed through a power control circuit 18, this circuit having the property of presenting a very low impedance across switches 15 and 17 while the timer is on, and thereafter presenting an extremely high impedance.

The overall functioning of the control circuit 18 is shown in block diagram form. A power triac circuit 19 is connected between switch contact 15 and 17 so that when the switch 12 is turned to the "timer" position wherein pole 14 makes contact to contact 15 the power triac circuit serves as a controllable switch through which the current passes to the load. A triac trigger circuit 20 controls the power triac circuit selectively to put it either in conductive or nonconductive mode, and the timer circuit 21 is provided to act as a control for the triac trigger circuit. The power supply circuit 22 derives its output voltage from the voltage drop across the power triac circuit 19 to supply power to the timer circuit 21.

Referring now to the detailed schematic circuit shown in FIG. 2, it will be noted that the immediate effect of throwing switch S12 to the timer position wherein pole 14 contacts terminal 15 alternating voltage from the means M—M when applied to lines 30 and 32 respectively. Across these lines are connected a power triac T1, a triac trigger circuit consisting of a series connected string of elements consisting of trigger triac T2, Zener diode Z1 having its anode connected to triac T2, and a resistor R1 completing the series string to line 32. Resistor R1 is nominally of 10 ohms, and the Zener diode Z1 has a nominal value of 10 volts breakdown, and as will subsequently be shown, this diode serves as a voltage regulating element for those elements comprising the power supply 22 of FIG. 1. Similarly disposed across the power lines and running from line 30 to line 32 are the principal elements of the power supply 22, consisting of a resistor R2 of nominal value 10,000 ohms, this resistor feeding the cathode of a diode D1, the diode D1 in turn feeding a parallel capacitor pair C1 and C3, the other end of the capacitor pair being coupled to the cathode of diode D2, the anode of D2 finally being connected to line 32 as will be discussed in more detail subsequently.

The remaining elements of FIG. 2 shown to the right of the power supply elements just described constitute the elements of the timer circuit 21 of FIG. 1, the details of which will subsequently be discussed in detail. At this point, only the broad features need be outlined.

The central element of the timer is a programmable commercially available integrated circuit timer 31 having the property that it is reset to an initial timing condition upon application of power thereto, the timer then placing its output at pin 8 in a high state to remain there until the elapse of a predetermined time set by a charging network, at the end of which time the timer automatically goes into a disabled state, placing its output in a low state. The figure reference numbers 1, 2, 3, and 8 shown with respect to the integrated circuit 31 represent the actual pin connections of the Motorola type MC14541B integrated circuit. Also, the positive supply terminal A of timer 31 represents the common interconnection of terminals 9, 12, 13, and 14 of this particular unit. Terminal B of integrated cicuit 31 represents terminals 5, 6, 7, and 10 of the Motorola circuit, and is the point where negative power supply voltage is to be supplied. It will be seen from FIG. 2 that the junction of diode D1 and capacitor C1 is connected to terminal A of integrated circuit 31, via line 24, and that the opposite side of this capacitor is connected to terminal B the line 25. The output terminal 8 is connected via line 26 through resistor R6 to drive the base of transistor Q1, the emitter being returned to terminal B, and the collector being returned via resistor R7 to the trigger terminal of triac T2. Resistors R6 and R7 have nominal values of 20,000 and 1,000 ohms respectively. A resistor R5 is connected between terminal 8 of integrated circuit 31 to terminal A thereof.

The functioning of the circuit of FIG. 2 upon closure of the switch 12 to the timer position 15 will now be considered in detail, with initial consideration being mainly directed at the power supply. Immediately before closure, the capacitor pair C1-C3 is in a bled-down condition as a result of a variety of leakage paths through the integrated circuit 31, as well as to through the resistors R5 and R6, and the emitter of transistor Q1. Immediately upon closure of switch 12, and upon the first positive rise in voltage of line 30 with respect to line 32, since no power has been supplied to the timer circuit via lines 24 and 25, accordingly output terminal 8' of integrated circuit 31 is, low resulting in transistor Q1 being turned off. As a result of this, the trigger electrode of transistor T2 is effectively floating, with the result that triac T2 is initially in a nonconducting state.

As the positive voltage rises on line 30, capacitor C1 charges through the string consisting of resistor R6 and diodes D1 and D2. The voltage across capacitor C1 therefore begins to rise, ultimately reaching a value sufficient to reset the timer element 31 to a reset condition, driving output terminal 8' high and turning on transistor Q1, thereby pulling the trigger electrode of triac T2 to a conducting potential, resulting in the energization of this element to a conducting state. Whether this energization occurs during the first positive half-wave of applied voltage to lead 30 or after a series of positive half waves is immaterial; the diodes D1 and D2 block capacitor C1 against discharge during the reverse half cycles. It will, however, be noted that since transistor Q1 is on, the potential of the end of resistor R7 tied to the collector of transistor Q1 will be within less than 1 volt of the potential of the integrated circuit local ground connected to terminal B, hence triac T2 will remain energized generally throughout all four quadrants of the full voltage wave form applied to lines 30 and 32, triac triggering occuring almost immediately upon each voltage axis crossing.

Thus, since triac TR1 may be viewed as being a conducting state at all times after reset of the timer 31, thereafter on all positive excursions of line 30 with respect to 32, capacitor C1 is charged through the low impedance of triac T2 and the forward drop of diode D2. As these positive excursions rise from zero, however, the Zener diode Z1 will fire at approximately 10 volts of line potential, thereby largely pinning the maximum voltage supplied to the capacitor C1 to approximately 10 volts. A well regulated direct voltage therefore appears across the terminals of capacitor C1 to supply power to the integrated circuit timer 31. The charge on capacitor C1 is thus replenished on each positive excursion of line 30 with respect to line 32. Moreover, when the Zener diode Z1 breaks down, the series resistor R1 now undergoes a substantial current therethrough, with the result that the trigger electrode of the main power triac T1 is pulled via line 34 well away from the potential of line 32, resulting in switching this triac to an on condition. This power triac T1 thus serves to provide the principal current carrying path to provide current to the load 11. It will be noted, however, that during these positive half cycles, this current is not provided until the voltage on line 30 rises to approximately 10 volts above the potential of line 32. As previously stated, during this interval the power supply circuit is replenished, and the loss of power available to the load is relatively trivial, the system being designed to operate from source voltages provided by the power mains M—M being of the order of 110 volts or more.

Recalling that triac T2 energizes almost instantly upon each axis crossing, it follows that during negative excusions of line 30 with respect to line 32, a substantial current flows through this triac via resistor R1 and Zener diode Z1, which is now biased in the forward direction. Here again the result is, as before, to raise the potential of the trigger electrode of triac T1 is almost immediately again pulled away from the potential of line 32 to energize this unit to a conducting condition, thus again supplying power to the system load 11. After an elapsed time set by the charging network R3, C2, connected to terminals 1', 2', and 3' integrated circuit 31, the output 8' reverts to a low state to remain there until the next reset operation, thereby de-energizing transistor Q1, and de-energizing triac T2.

Under such conditions, however, although the charging of capacitor C1 through diodes D1 and D2 continues as before, the current through Zener diode Z1 on breakover in the positive cycle is limited by the high 10,000 ohm value of resistor R2, as a result of which insufficient current flows through resistor R1 to trigger the main power triac T1 on the forward cycle. On reverse cycles, triac T2 again remaining in an open condition, since no current flows through resistor R1 because of the blocking action of diode D1. Thus, the main power triac T1 cannot fire and the load is disconnected accordingly. Because of the built-in inability of the integrated circuit 31 to revert to a reset condition until power is removed from terminals A and B and is subsequently reapplied thereto, it follows that the load is permanently shut down by the overall action of the circuit, to remain in such condition until it is reactuated.

To reactivate the timer to initiate a new timing operation, the pole 14 of switch 12 must be moved for a period of a second or so to either of the two remaining positions 16 or 17. During such interval capacitor C1 will bleed down by mechanisms as previously described. The integrated circuit 31 will thereafter be ready to initiate a new one-shot timing cycle upon actuation of the rotor 14 to the timer-on position where it contacts pole 15 thereof. A varister V1 is provided across the system power leads 30 and 32 to provide a measure of surge suppression so as to protect the various components of the power control circuit.

Considering the timing circuit based upon integrated circuit 31 in more detail, it will be recalled that this circuit uses the Motorola MC14541B unit, a low-power complementary metal-oxide-semiconductor integrated circuit having the property that it is reset to an initial timing condition upon each application of power. The timing period is set by the values of resistors R3 and R4 and the value of capacitor C2. After expiration of the timing period the output terminal 8' goes high. As previously described, the terminal designations shown are in consonance with the terminal designations of this particular unit as manufactured; however, it will be evident to those knowledgeable in the art that a variety of timing circuits may equally well be applied to provide a similar one-shot output pulse, provided that provision is made that the output goes to a temporary first state for the duration of a timing period after intial application of power to the timer, and provided that at the expiration of said timing period the output terminal reverts to a latched second state to remain there until power is removed from the timer and subsequently applied thereto. This latching feature is central to the operation of the circuit as describe herein.

FIG. 3 shows a preferred embodiment of the circuit of FIG. 2 adapted to be mounted in a standard wall switch receptacle, the unit consisting of a circuit board 28 carrying thereon the elements of the power control circuit 18 of FIGS. 1 and 2. A face plate 34 carries the three position switch 12 of FIGS. 1 and 2 mounted thereon and having a forwardly projecting associated actuated handle 12', the handle being disposable to center, upper, and lower positions respectively corresponding to a selective contact to contacts 15, 16, and 17 of the switch. In the embodiment shown in FIG. 3, the switch S12 (not shown) is contained within a rearwardly extending housing 36 mounted to the panel 34 preferably by conventional front-insertion snap-in means (not shown) of a type frequently provided on commercially available faceplate-mounted switches, the switch housing extending rearwardly from the panel 34. The housing 36 is fixedly attached to the circuit board 28 to provide support therefor. This attachment may be by variety of means, most preferably by fastening the circuit board 28 to the rear of the switch housing 36 either by means of screw terminals (not shown) passing through the circuit board from the rear, or alternatively by solder lugs (not shown) extending rearwardly from the switch housing 36 and passing through appropriate openings in circuit board 28 to be fastened thereto by conventional means, e.g. by soldering to adjacent metallization paths on the circuit board itself. The assemby 40 shown in FIG. 3 is held together by screws 42 extending rearwardly through the front panel 34 via clearance holes 43 therein and into threaded screw holes 44 in the box 27. The power leads 30' and 32 shown in FIGS. 1 and 2 are seen exiting from holes in the circuit board 28 to exit the housing 27 from the rear as indicated.

FIG. 4 shows the completed control circuit assembly 40 positioned for insertion into a conventional wall switch receptacle 27a, the power leads 30' and 32 thereof being connected to conventional power switching lines 44—44 via connectors 33—33. A face plate 35 is provided bearing the legends "ON", "OFF", and "TIMER" placed to one side of a matching cut-out 50 configured to accept the outwardly extending switch handle 12' of the power unit 40. The entire assembly is secured to the wall receptacle box 27a by means of screws 45—45 passing through clearance holes 52 in the cover plate 35, clearance holes 54 in the front plate 34 of the assembly 40, and threadingly engaging holes 48 in the wall mounted switch box 27a. It will be noted that the switch is of the vertically actuated toggle type, and is configured to fit a standard face-plate vertical slot cut-out.

Thus, there has been described a simple power-off timing circuit configured to be mounted in a conventional wall switch plate receptacle, and selectively actuatable by a single three-position switch to a power-on, a power-off, and a timer-on condition. Moreover, in contrast to the Monahan system cited in the Background of the Invention, the timing circuit and its associated power supply are completely disconnected from the power lines except during a limited period of operation of the timer in its active phase, and can be connected directly to "hot" wires of the power line to which a conventional switch is normally connected, without requiring feeding the common side of the line to the timer. In contrast to the Weber system mentioned in the Background of Invention, only a single switch is employed, and no power supply current is required while the load is in the regular power-on condition. The number of necessary parts is held to an absolute minimum, a substantial measure of circuit simplicity and cost economy being achieved by using the self-resetting feature of a commercially available integrated circuit timing chip.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out the invention, but that the invention will include all embodiments falling within the scope of the appended claims.

I claim:

1. A controller to be connected across a first conductor extending to one terminal of a load device whose other terminal is connected to one of a pair of AC power lines having the applied voltage thereacross and a second conductor extending to the other power line, said controller comprising: parts support means adapted to be mounted in or upon a standard wall switch box, said parts support means having extending therefrom first and second controller input lead means to be respectively connected to said first and second conductors; said parts support means having mounted thereon a threeposition manually operable switch having a movable pole and stationary timer-on, power-off and load-on contacts to which said movable pole can make selective sequential engagement, a handle secured to said movable pole and projecting forwardly from said parts support means to project through a vertical slot in a cover plate and adapted to be moved vertically by the operator into any one of three stable positions where said movable pole selectively contacts one of said stationary contacts, said load-on contact being connected to said second controller input lead means and said movable pole being connected to said first controller input lead means so that when said movable pole is moved to said load-on contact the load device becomes energized, a timer which when energized supplies a control signal for a preset period of time, DC voltage producing means coupled between said timer-on contact and said second input lead means for developing a DC voltage to energize said timer, said DC voltage means including rectifier means and voltage storage means which is charged through the rectifier means when the AC applied voltage is coupled thereto, said timer having power input terminals coupled to said storage means to be energized therefrom, and power switch means having terminals connected between said timer-on contact and said second input lead means and adapted when in a low impedance condition to couple AC power to the load through said controller input lead means, said power switch means having a control terminal to which said control signal is coupled to effect a low impedance condition between said terminals which then interconnects said timer-on contact and second controller input lead means.

2. The controller of claim 1 wherein said timer includes reset means for initiating a new timing cycle when said movable pole is moved away from said timer-on contact to break contact therewith and then is recontacted to said timer-on contact.

3. The controller of claim 2 combined with a first conductor extending to one terminal of the load device whose other terminal is connected to one of a pair of AC power lines having the applied voltage thereacross, and a second conductor extending to the other power line, said first and second controller input lead means being respectively connected to said first and second conductors.

4. The controller of claim 1 wherein said power switch means includes a triac having its load terminals coupled between said timer-on contact of said manually operable switch and said second controller input lead means.

5. The controller of claim 4 wherein said DC voltage producing means includes means for delaying the firing of said triac during periodic initial voltage excursions from zero volts applied between said load terminal thereof until a given voltage value is applied between said terminals, said rectifier means being coupled to said load terminals to charge said storage means during said excursions.

6. The controller of claim 5 wherein said means for delaying the firing of said triac includes a Zener diode having a breakdown voltage substantially equal to said given voltage and coupled across said load terminals, and means for coupling the breakdown current flowing through said diode to trigger said triac to a conducting state.

7. The controller of claim 4 further including a resettable monostable circuit being powered by the voltage presented thereto from said storage means and having a stable output state and an unstable output state, said monostable circuit being activated from said stable state to said unstable state responsively to an increase in said storage means voltage above a given threshold value to remain in said unstable state for a given time thereafter whereupon said monostable circuit reverts to said stable state, said timer having associated therewith discharging means for discharging said storage means when said movable pole of said manually operable switch is not connected to said timer-on contact thereof so that said monostable circuit is returned to said stable output state, said timer further having trigger means coupled to said monostable circuit and responsive to the output state thereof for enabling said triac to a conducting power-on condition when said monostable circuit is in said unstable state and to a nonconducting power-off condition during said stable state thereof.

8. The controller of claim 1 wherein said storage means comprises at least one capacitor coupled to be charged by said rectifier means.

* * * * *